United States Patent
Friborg, Jr.

(10) Patent No.: US 10,373,206 B2
(45) Date of Patent: Aug. 6, 2019

(54) TAP TO SUBSCRIBE TO TEXT MESSAGE ALERTS

(71) Applicant: eBay Inc., San Jose, CA (US)

(72) Inventor: George Vincent Friborg, Jr., Wyndmoor, PA (US)

(73) Assignee: eBay Inc., San Jose, CA (US)

( * ) Notice: Subject to any disclaimer, the term of this patent is extended or adjusted under 35 U.S.C. 154(b) by 144 days.

(21) Appl. No.: 14/303,377

(22) Filed: Jun. 12, 2014

(65) Prior Publication Data
US 2015/0363831 A1 Dec. 17, 2015

(51) Int. Cl.
*G06Q 30/02* (2012.01)
*H04W 4/14* (2009.01)
*H04L 12/58* (2006.01)
*H04L 12/18* (2006.01)

(52) U.S. Cl.
CPC ..... *G06Q 30/0267* (2013.01); *G06Q 30/0257* (2013.01); *H04L 51/14* (2013.01); *H04W 4/14* (2013.01); *H04L 12/1859* (2013.01)

(58) Field of Classification Search
CPC .................................................. G06Q 30/02
USPC .................................... 705/14.56; 455/414.1
See application file for complete search history.

(56) References Cited

U.S. PATENT DOCUMENTS

| 8,233,925 B1 * | 7/2012 | Boyle | H04W 4/206 |
| | | | 455/414.1 |
| 8,472,924 B2 * | 6/2013 | Watson | H04L 12/1822 |
| | | | 455/414.1 |
| 8,630,670 B2 | 1/2014 | Sweeney | |
| 2006/0258380 A1 | 11/2006 | Liebowitz et al. | |
| 2014/0006158 A1 * | 1/2014 | Cooper | G06Q 30/02 |
| | | | 705/14.56 |
| 2014/0012661 A1 | 1/2014 | Hayes, Jr. | |

OTHER PUBLICATIONS

"International Application Serial No. PCT/US2015/035329, International Search Report dated Sep. 15, 2015", 2 pgs.
"International Application Serial No. PCT/US2015/035329, Written Opinion dated Sep. 15, 2015", 5 pgs.
Okazaki, Shintaro, et al., "What is SMS advertising and why do multinationals adopt it? Answers from an empirical study in European markets", Journal of Business Research, (2007), 9 pgs.

* cited by examiner

*Primary Examiner* — Marilyn G Macasiano
(74) *Attorney, Agent, or Firm* — Schwegman Lundberg & Woessner, P.A.

(57) ABSTRACT

A system comprising a computer-readable storage medium storing at least one program, and a computer-implemented method for providing text message alerts. A telephony interface module receives an alert enrollment request from a client device. The alert enrollment request is received through a first type of communication channel. The alert enrollment request includes a protocol specific portion that includes a communication endpoint identifier assigned to the client device. A data database management module links the communication endpoint identifier to an opt-in record. A text message interface module communicates, based on the client device identifier being linked to the opt-in record, an alert to the client device through a second type of communication channel. The alert is addressed to the client device based on the communication endpoint identifier linked to the opt-in record.

19 Claims, 11 Drawing Sheets

TAP TO SUBSCRIBE TO TEXT MESSAGE ALERTS

TECHNICAL FIELD

Example embodiments of the present application generally relate to text messaging and, more particularly in one embodiment, to a system and method for providing text message alerts.

BACKGROUND

Marketplaces can be online and/or real world (e.g., brick and mortar). Online marketplaces can include websites or mobile applications where users may buy or sell goods or services (referred to collectively as "items") from a provider of the online marketplace or other users of the online marketplace. The goods or services (referred to collectively as "items") are described in a published listing. Similar to online marketplaces, real-world marketplaces may have websites that allows users to view inventory or interact with the real-world marketplace. Any of these online browsing environments may serve online advertisements to users during the course of their pursuits of online activities.

One approach for providing consumers with advertisements is by serving email advertisements. Another form of advertisements is online banner advertisements that may be displayed on various webpages, including webpages on third party websites. Accordingly, consumers can be exposed to a variety of advertisements throughout the consumers' online experience. Given the rapid increase in the number of online marketplaces, customers may become overwhelmed by the number of shopping options and online advertisements. As a result, some marketplaces may not be able to effectively market to consumers.

BRIEF DESCRIPTION OF THE DRAWINGS

In the drawings, which are not necessarily drawn to scale, like numerals may describe similar components in different views. Like numerals having different letter or numeric suffixes may represent different instances of similar components. The drawings illustrate generally, by way of example, but not by way of limitation, various embodiments discussed in the present document.

DETAILED DESCRIPTION

Figure 1:
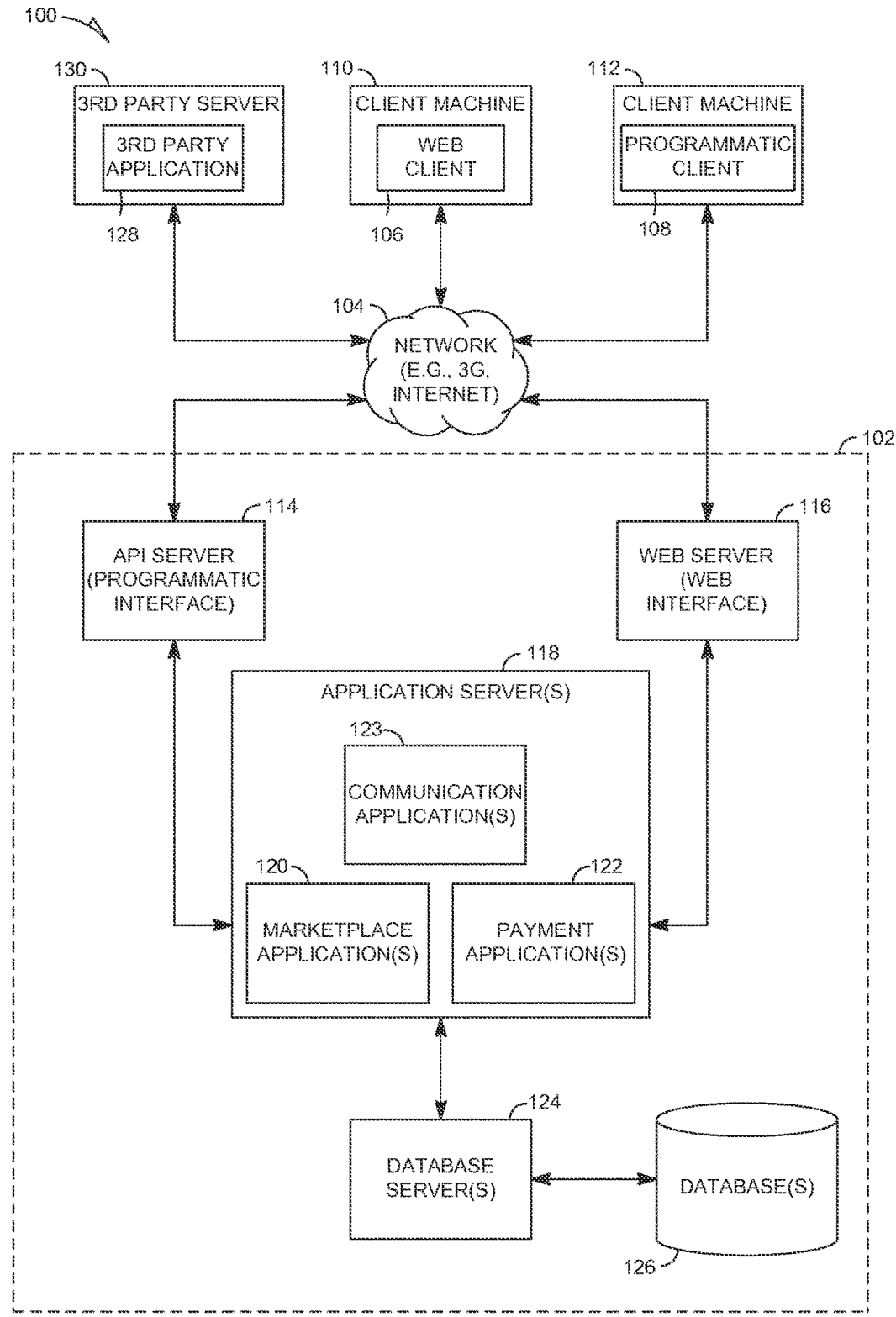
FIG. 1 is a network diagram depicting a client-server system, within which one example embodiment may be deployed.

Reference will now be made in detail to specific example embodiments for carrying out the inventive subject matter. Examples of these specific embodiments are illustrated in the accompanying drawings. It will be understood that they are not intended to limit the scope of the claims to the described embodiments. On the contrary, they are intended to cover alternatives, modifications, and equivalents as may be included within the spirit and scope of the disclosure as defined by the appended claims. In the following description, specific details are set forth in order to provide a thorough understanding of the subject matter. Embodiments may be practiced without some or all of these specific details. In addition, well known features may not have been described in detail to avoid unnecessarily obscuring the subject matter.

In accordance with the present disclosure, components, process steps, and/or data structures may be implemented using various types of operating systems, programming languages, computing platforms, computer programs, and/or general purpose machines. In addition, those of ordinary skill in the art will recognize that devices of a less general purpose or nature, such as hardwired devices, field programmable gate arrays (FPGAs), application specific integrated circuits (ASICs), or the like, may also be used without departing from the scope and spirit of the concepts disclosed herein. Embodiments may also be tangibly embodied as a set of computer instructions stored on a computer readable medium, such as a memory device.

Example methods and systems for providing text message alerts to users are described. In the following description, for purposes of explanation, numerous specific details are set forth in order to provide a thorough understanding of example embodiments. It will be evident, however, to one skilled in the art that the present invention may be practiced without these specific details.

Text messaging marketing and alerts may provide an effective way for retailers to communicate to potential customers. However, the opt-in process (also referenced herein as "subscription process") for subscribing to text message alerts may discourage users from opting in to receive text message alerts. For example, one way for customers to subscribe to text message alerts us to fill out a web-based application form. After completing and submitting the application form to the retailer, a text message is sent to the user's mobile phone confirm that the user consents for the retailer send text message alerts to the mobile phone. As a result, not only does the user have to fill out a web-based form, but the user must also reply to a text message.

In an example embodiment, a text messaging system provides data for displaying a webpage or software application on a user device. For example, the user may browse the website of a particular online retailer. The webpage may display a button for subscribing to receive text message alerts. By clicking on the button of the user interface, the user's mobile phone automatically initiates a phone call to the text messaging system. Because the text messaging system receives a phone call, the text messaging system may determine the phone number of the user's mobile phone automatically without further user action. In particular, the text messaging system may utilize caller ID technology to capture the phone number. Accordingly, the text messaging system may create an opt-in record corresponding to the identified phone number. A confirmation text message may be provided to the user at the completion of creating the opt-in record, wherein the confirmation text message states the title of the text message program, the frequency of alerts, whether data rates and/or messaging rates apply, and/or one or more commands. This way the user may be informed about the subscription.

Additionally or alternatively, while the phone call is still active, the text messaging system may provide the user a voice message for additional information regarding the retailer's services, including the text message service. Additionally, in an example embodiment, the text messaging system may offer the user a reward for staying on the line and taking part of a survey. The user may respond to the prompts of the survey by using the keypad of the mobile phone or by using voice commands. Example prompts of the survey may relate to the user's gender, zip code, date of birth, and the like. Since the user is able to speak out the answers the survey, it may be easier to provide answers to the survey than it would have been if the user had to type text via a web-based form and/or text messages. Moreover, an oral survey may be less intimidating than a written survey.

In another aspect of the text messaging system, a program can generate targeted text message alerts based on the survey as well as browser activities of the subscribers in order to improve the users' experience. For example, a subscriber can receive text message alerts that are tailored to the interests of the subscriber. For example, the program may monitor the activities (referred to as "browsing activities" or "online activities" herein) of the subscriber on certain websites and, based on the subscriber's interactions with objects of the website, match particular alerts related to the subscriber's behaviors. Additionally or alternatively, the text messaging system may be alerts based on the age and/or location of the subscriber, as indicated via the survey. As stated, rewards may be triggered by certain events, such as the subscriber's birthday, for example. Accordingly, the subscriber may receive alerts that interest the subscriber and mat receive less unrelated alerts, thereby increasing the usefulness of the program to the subscriber. Furthermore, targeted text messages may increase the subscriber's satisfaction with the program, and thus may result in the subscriber referring the program to a contact.

By utilizing a phone call to initiate the opt-in process (e.g., in contrast to web-based or text messaging-based communications), the text messaging system may facilitate additional verification checks to inhibit fraudulent subscriptions. For example, the text messaging system may prompt the user for a particular voice response during the phone call. The text messaging system may prompt for a simple voice response in a way that is natural conversational, such as stating "yes" to the question "would you like to sign up for text message alerts?" As a result, the verification process may be unobtrusive to the user experience. In an alternative embodiment, the system may prompt the user to repeat a phrase selected at random. This way, it may be difficult for a software program to exploit the text messaging system.

An online marketplace is a website or mobile application where a user may buy or sell items from a provider of the online marketplace or other users of the online marketplace. The items are described in a published listing. The listing may indicate various properties or characteristics of the good, service, or proposed transaction such as brand, make, model, year, category, price (e.g., a current high bid, reserve price, or buy it now price), color, size, condition, sale type (e.g., auction or buy it now), seller, shipping availability and details, location, keywords, categories, or identifiers (e.g., UPC or ISBN code). The online marketplace may catalogue items for sale to group listing describing similar items together. The catalogue may provide a single, standard description of fungible items and include at least a portion of the various properties or characteristics.

In some instances, the online marketplace is associated with a real-world marketplace such as a bricks and mortar store or a chain of bricks and mortar stores. The real-world marketplace may have the same inventory, overlapping inventory, or different inventory than its associated online marketplace. The real-world marketplace may have a website that allows users to view inventory or interact with the real-world marketplace.

As stated, the online marketplace or the real-world marketplace may communicate to its users various alerts, e.g., electronic messages of items for sale, discounts or other offers, events, or the like marketing notifications. The communication may occur via text or multimedia messages (e.g., short message service (SMS), enhanced messaging service (EMS), multimedia messaging service (MMS), or the like, collectively referred to simply as "text messages") sent or received using a phone (e.g., feature phone or smartphone) of the user. In some instances, the user ("subscriber") may sign up with the marketplace to receive text messages from the marketplace. Text messages may be sent on a regular basis or on a scheduled basis. In some embodiments, the user may provide various constraints on text message communications. Moreover, the marketplace can inhibit sending text messages to a user unless the user has subscribed and provided written authorization to receive text messages (e.g., via an opt-in process).

FIG. 1 is a network diagram depicting a client-server system 100, within which one example embodiment may be deployed. A networked system 102, in the example forms a network-based marketplace or publication system, provides server-side functionality, via a network 104 (e.g., the Internet or Wide Area Network (WAN), as well as a telecommunication system such as a public switched telecommunication network (PSTN) or a 3rd-generation (3G) wireless communications network) to one or more clients. FIG. 1 illustrates, for example, a web client 106 (e.g., a browser), and a programmatic client 108 executing on respective client machines/devices 110 and 112.

An Application Program Interface (API) server 114 and a web server 116 are coupled to, and provide programmatic and web interfaces respectively to, one or more application servers 118. The application servers 118 host one or more marketplace applications 120, payment applications 122, and communication applications 123. The application servers 118 are, in turn, shown to be coupled to one or more databases servers 124 that facilitate access to one or more databases 126.

The marketplace applications 120 may provide a number of marketplace functions and services to users that access the networked system 102. The payment applications 122 may likewise provide a number of payment services and functions to users. The payment applications 122 may allow users to accumulate value (e.g., in a commercial currency, such as the U.S. dollar, or a proprietary currency, such as "points") in accounts, and then later to redeem the accumulated value for items that are made available via the marketplace applications 120. The communication applications 123 may likewise provide a number of communication services and functions to users. In one embodiment, the communication applications 123 may provide the marketplace applications 120 and payment applications 122 various text messaging services, such as SMS/MMS communication services. For example, the marketplace applications 120 and payment applications 122 may communicate recipient and content information to the communication applications 123, and in response, the communication applications 123 can transmit text messages based on recipient and content information in accordance with SMS, MMS, or the like communication protocols. Additionally, the communication applications 123 may receive text messages based on SMS, MMS, and/or the like protocols and may communicate recipient and content information to the marketplace applications 120 and payment applications 122. Accordingly, the marketplace applications 120 and payment applications 122 may transmit and receive text messages with users. While the marketplace, payment, and communication applications 120, 122, 123 are shown in FIG. 1 as all forming part of the networked system 102, it will be appreciated that, in alternative embodiments, each of the marketplace, payment, and communication applications 120, 122, 123 may form part of respective marketplace, payment, and/or communication services that are separate and distinct from the networked system 102.

Further, while the system 100 shown in FIG. 1 employs a client-server architecture, the present invention is of course not limited to such an architecture, and could equally well find application in a distributed, or peer-to-peer, architecture system, for example. The various marketplace, payment, and communications applications 120, 122, 123 could also be implemented as standalone software programs, which do not necessarily have networking capabilities.

In addition, while the various marketplace, payment, and communications applications 120, 122, 123 have been described above as having separate functionalities, in alternative embodiments these functionalities may be performed by any one or more of the various marketplaces, payment, and communications applications 120, 122, 123.

The web client 106 accesses the various marketplace and payment applications 120 and 122 via the web interface supported by the web server 116. Similarly, the programmatic client 108 accesses the various services and functions provided by the marketplace and payment applications 120 and 122 via the programmatic interface provided by the API server 114. The programmatic client 108 may, for example, be a seller application (e.g., the TurboLister application developed by eBay Inc., of San Jose, Calif.) to enable sellers to author and manage listings on the networked system 102 in an off-line manner, and to perform batch-mode communications between the programmatic client 108 and the networked system 102.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more promotional, marketplace, or payment functions that are supported by the relevant applications of the networked system 102.

Example Mobile Device

Figure 2:
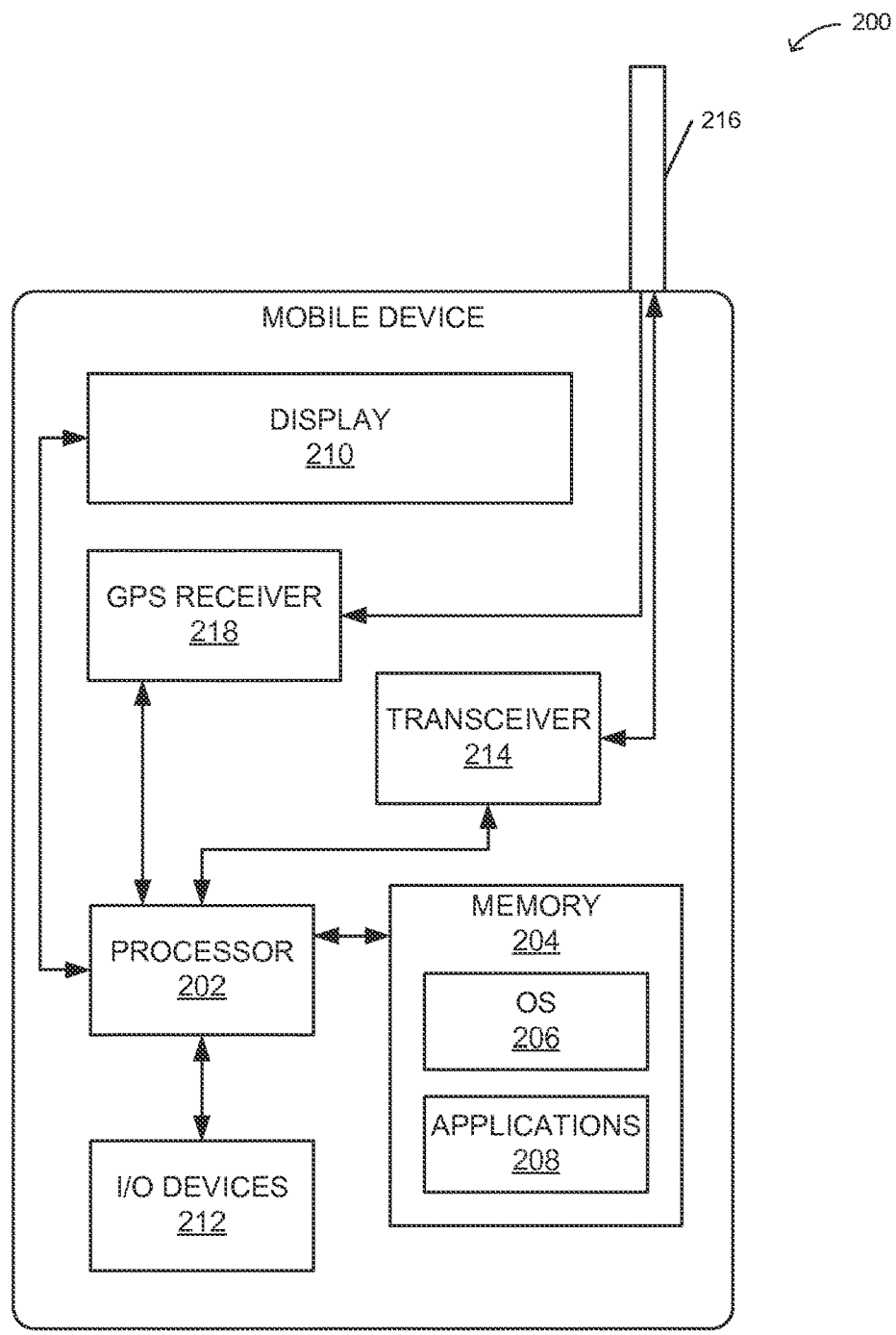
FIG. 2 is a block diagram illustrating a mobile device, according to an example embodiment.

FIG. 2 is a block diagram illustrating a mobile device 200, according to an example embodiment. The mobile device 200 may include a processor 202. The processor 202 may be any of a variety of different types of commercially available processors suitable for mobile devices (for example, an XScale architecture microprocessor, a Microprocessor without Interlocked Pipeline Stages (MIPS) architecture processor, or another type of processor). A memory 204, such as a random access memory (RAM), a Flash memory, or other type of memory, is typically accessible to the processor. The memory 204 may be adapted to store an operating system (OS) 206, as well as application programs 208, such as a mobile location enabled application that may provide Location Based Services (LBSs) to a user. The processor 202 may be coupled, either directly or via appropriate intermediary hardware, to a display 210 and to one or more input/output (I/O) devices 212, such as a keypad, a touch panel sensor, a microphone, and the like. Similarly, in some embodiments, the processor 202 may be coupled to a transceiver 214 that interfaces with an antenna 216. The transceiver 214 may be configured to both transmit and receive cellular network signals, wireless data signals, or other types of signals via the antenna 216, depending on the nature of the mobile device 200. Further, in some configurations, a GPS receiver 218 may also make use of the antenna 216 to receive GPS signals.

Figure 3:
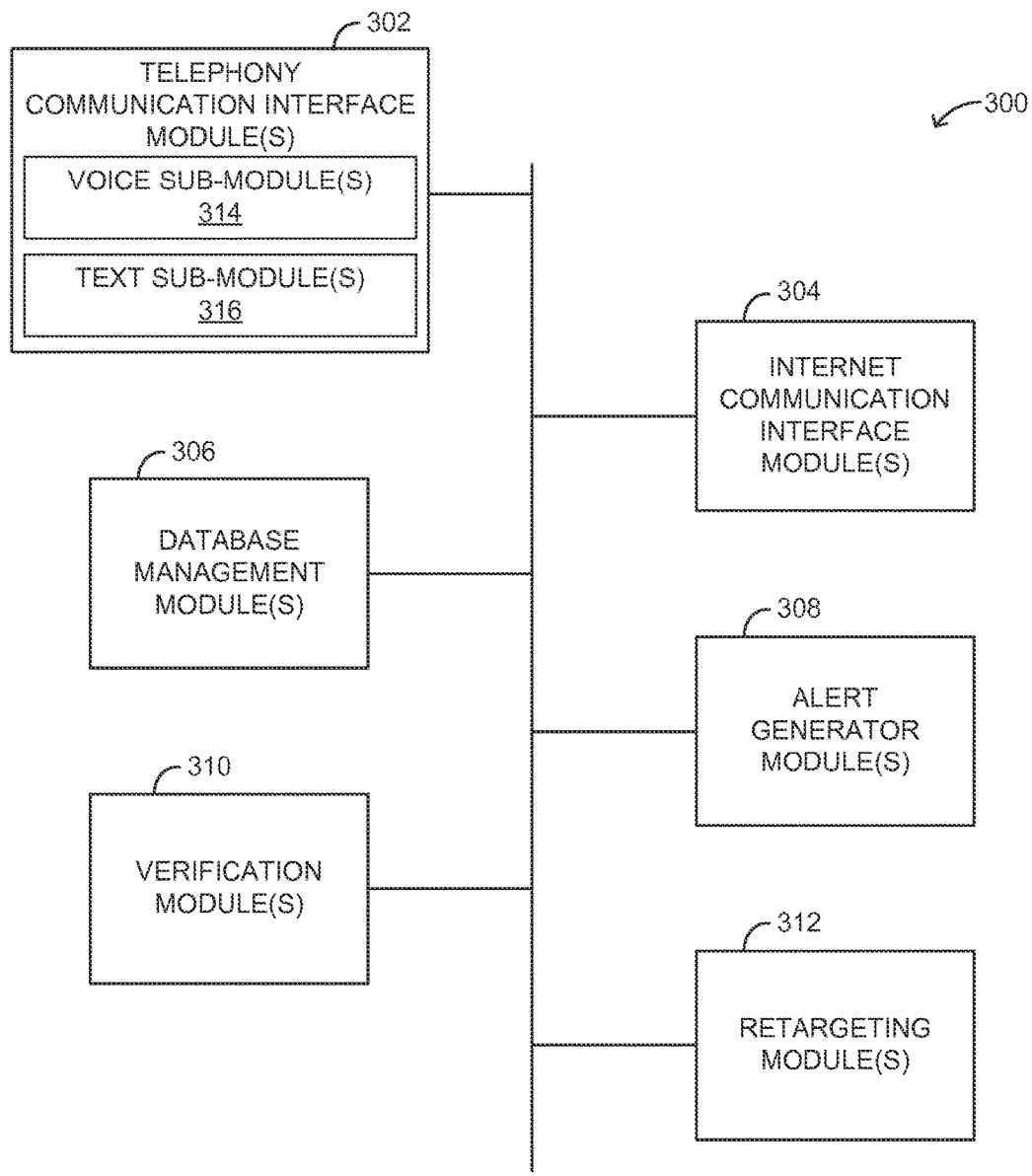
FIG. 3 is a block diagram illustrating an example embodiment of a digital content system including multiple modules forming at least a portion of the client-server system of FIG. 1.

FIG. 3 is a block diagram illustrating an example embodiment of a text messaging system 300 including multiple modules 302-312 forming at least a portion of the client-server system of FIG. 1. The modules 302-312 of the illustrated text messaging system 300 include a telephony interface module(s) 302, an Internet interface module(s) 304, a database management module(s) 306, an alert generator module(s) 308, a verification module(s) 310, and a retargeting module 312. The telephony interface module 302 includes a voice sub-module 314 (or "telephony interface") and a text sub-module 316 (or "text message interface").

In some embodiments, the components of the text messaging system 300 can be included by the online marketplace application 120 of FIG. 1. However, it will be appreciated that in alternative embodiments, one or more components of the text messaging system 300 described below can be included, additionally or alternatively, by other devices, such as one or more of the applications 122, 123, the servers 114, 116, 118, 130, the network 104, and/or the client machines 110, 112 of FIG. 1.

The modules 302-312 of the text messaging system 300 may be hosted on dedicated or shared server machines (not shown) that are communicatively coupled to enable communications between server machines. Each of the modules 302-312 are communicatively coupled (e.g., via appropriate interfaces) to each other and to various data sources, so as to allow information to be passed between the modules 302-312 of the text messaging system 300 or so as to allow the modules 302-312 to share and access common data. The various modules of the text messaging system 300 may furthermore access one or more databases 124 via the database servers 126.

The text messaging system 300 may provide a number of offers, sales, discounts, listings, and/or pricing notifications whereby a seller may list (or publish information concerning) items for sale, a buyer can express interest in or indicate a desire to purchase such items, and a price can be set for a transaction pertaining to the items. In particular, users can subscribe to receive text message alert of product offers, sales, discounts, listings, and/or pricing. The subscription process may include receiving an alert enrollment request from a client device, such as a mobile phone. The alert enrollment request may be in the form of a phone call to a particular number assigned to the text messaging system 300. As will be described in greater detail later in connection with FIG. 4, the alert enrollment request may be initiated by the user selecting, on the client device, a user interface element that automatically dials a number for the text messaging system 300.

In response to receiving the phone call from the client device, the text messaging system 300 may identify and store the phone number associated to the client device. Based on this data, an opt-in record may be created so that the text messaging system 300 may send text message alerts to the client device as per the terms and conditions the client agreed to at the time of opt-in.

To this end, the text messaging system 300 is shown to include the telephony interface module 302, the Internet interface module 304, the database management module 306, the alert generator module 308, the verification module 310, and the retargeting module 312, which together with the communication applications 123 of FIG. 1 can serve to provide text message alerts.

The telephony interface module 302 may be a hardware-implemented module which may transmit and/or receive communications over a telecommunication network. For example, the telephony interface module 302 may interface with a PSTN system. As such, telephony interface module 302 may communicate with the PSTN system in accordance with PSTN protocols. It will be appreciated that the telecommunication network need not correspond to a PSTN system. The telecommunication network may be any communication network suitable for transmitting voice and text communications in accordance with the description provided herein.

The telephony interface module 302 may receive and transmit digital and/or analog communications to mobile and/or fixed telephones. One or more telephone numbers may be assigned to the telephony interface module 302 so that a phone may call the telephony interface module 302. Furthermore, the telephony interface module 302 may receive or send caller identification ("caller ID") data. For example, the telephony network (e.g., PSTN) handling the call may transmit caller ID data to the telephony interface module 302 when a phone calls the text messaging system 300. The text messaging system 300 may be capable of receiving caller ID data in accordance with Single Data Message Format (SDMF), which may include the caller's telephone number, the date, and time of the call. Additionally or alternatively, the text messaging system 300 may be capable of receiving caller ID data in accordance with Multiple Data Message Format (MDMF), which may include the caller's telephone number, the date, and time of the call, and the directory-listed name for the telephone number. Caller ID data may be used to determine a geographical location of a calling phone.

To support both voice and text messaging, the telephony interface module 302 includes the voice sub-module 314 and the text sub-module 316. The voice sub-module 314 of the telephony interface module 302 may be a hardware-implemented module which may transmit and/or receive voice communications over a telecommunication network. The text sub-module 316 of the telephony interface module 302 may be a hardware-implemented module which may transmit and/or receive text communications over a telecommunication network. For example, the voice sub-module 314 and/or the text sub-module 316 may include, or communicate with, gateway devices to the telecommunication network.

In operation, the voice sub-module 316 may receive the alert enrollment request from a client device, such as a mobile phone. The alert enrollment request may be received through a first type of communication channel, such as a voice call service provided by a telephony network (e.g., PSTN). The alert enrollment request may include a protocol specific portion that includes a communication endpoint identifier assigned to the client device. For example, the communication endpoint identifier may correspond to a telephone number of the client device. In particular, data indicative of the telephone number may be received with the alert enrollment request as part of the protocol of the PSTN system. For example, the alert enrollment request may include caller line identification data received as part of a caller ID communication. As will be described in greater detail below, the voice sub-module 314 may provide the communication endpoint identifier as an output to the database management module 306 for creating or updating the opt-in records.

In operation, the text sub-module 316 may communicate a confirmation message to the client device through a second type of communication channel, such as a text message service provided by a telephony network. The confirmation message may confirm the successful completion of the opt-in process. The confirmation message may include a name for the alert program, the frequency of text message alerts, information about data rates, and instructions for requesting help and cancellation.

The text sub-module 316 may also communicate text message alerts to the client device to provide marketing information. The text message alerts may correspond to text messages containing content provided by the alert generator module 308.

The Internet interface module 304 may be a hardware-implemented module which may provide Internet-based communications over a third type of communication channel, such as an Internet protocol service provided by the Internet. In operation, the Internet interface module 304 may provide an alert enrollment invitation to the client device. The alert enrollment invitation may correspond to a webpage or application rendered on the client device. The user interface of the alert enrollment invitation may include a selectable control element for causing the client device to initiate the alert enrollment request. The selectable control element may correspond to a user interface button containing data and code that causes the user's mobile phone to dial the phone number associated with the text messaging system 300.

The database management module 306 may be a hardware-implemented module which may maintain user account information, such as opt-in records, to facilitate one or more subscriptions. The database management module 306 may interface with one or more data storage devices, such as the database 126 of FIG. 1, to read or write data.

The database management module 306 can be configured to maintain user account data, including adding and storing new user accounts for users who request to receive text message alerts, as well as storing data related to retargeting. For example, in one embodiment the database management module 306 can receive from a client device user account information (also referred to as "user account data") for subscribing to receive text message notifications. The user account information can include, among other information, data indicating that there was written authorization from the user for the seller to provide text message alerts for offers, sales, discounts, listings, pricing, and/or other notifications. In some embodiments, the text messaging system 300 will not send text messages to a user unless that user has provided written authorization. Written authorization can include the user initiating a phone call with an electronic device in a manner that indicates the user's express authorization. It will be appreciated that authorization can be expressed in any suitable manner, such as actions that are in accordance with local laws and policies.

In response to receiving user account information, the database management module 306 can add or store a user account to a database of subscribers. Each user account of the database of subscribers can correspond to a user who has subscribed to receive at least some type of notification. User accounts can be active or inactive. An active user account is an account in which the text messaging system 300 can send text message alerts to the corresponding user. An inactive user account is an account in which the user account includes data of the user but the text messaging system 300 will not send text message notifications to the corresponding user. For example, the database management module 306 can be set an account as inactive if the account does not have or has lost authorization. Additionally, the database management module 306 can be configured to set an account as inactive if a time period lapses (e.g., if the user has subscribed to receive text message alerts for a set amount of time) of or text message alert limit can become inactive (e.g., if the user has subscribed to receive text message alerts for a set number of alerts).

In some embodiments, the types of offers, sales, discounts, listings, and/or pricing of the notifications can be determined based on data stored in the respective user account. For example, the particular notifications can be determined (e.g., targeted) based on past user purchase history, purchased products, purchase times, purchase values, shipping destination, location, and other like considerations indicative of user preferences or interests. A location (e.g., city and state) of the user can be determined based on the caller ID data for the phone making a call for an alert enrollment request. In one aspect, among others, targeted alerts can increase the likelihood that the user will make a purchase. In addition, targeted alerts can help create a positive user experience and thus increase the number of people whom the user may refer.

The database management module 306 may link a communication endpoint identifier to an opt-in record. In one way, the database management module 306 links the identifier by writing the identifier to a data structure associated with the opt-in record. The linking of the communication endpoint identifier may be responsive to the client device establishing the first type of communication channel with the telephony indication interface module 302. As stated, the telephony interface module 302 may communicate a confirmation message to the client device. Moreover, in accordance with opt-in record, the telephony interface module 302 may communicate alert messages (e.g., text message alerts) to the client device.

To link the communication endpoint identifier to the opt-in record, the database management module 306 may determine the communication endpoint identifier by accessing caller line identification data of the alert enrollment request. Furthermore, the database management module 306 may determine whether the determined communication endpoint identifier is linked to an existing opt-in record. If there is no existing opt-in record, the database management module 306 may create a new opt-in record. Alternatively, there is an existing opt-in record matching the communication endpoint identifier, the database management module 306 may update the opt-in record to reflect the data of the alert enrollment request. Additionally or alternatively, the text messaging system 300 may transmit a notification message to the client device to inform the user that there was a request to opt-in to the pre-existing account.

The alert generator module 308 may be a hardware-implemented module which may provide content for generating text message alerts. In one aspect, the text message alerts may be dynamically generated or published based on information from the sellers (e.g., based on the products) and the subscribers (e.g., based on personal data). Content for the text message alerts may be selected from a database of candidate text message alerts, which may be updated dynamically by the sellers. Accordingly, the alert generator module 308 can be configured to generate one or more text messages based on the activities of the users related to subscribing, referrals, and the like activities.

The verification module 310 may be a hardware-implemented module which may facilitate verification of data provided from the user device. For example, the verification module 310 may determine whether the client device is a mobile phone based on the communication endpoint identification. For example, the verification module 310 may perform a carrier verification process by searching a database of mobile phones numbers for a match with the communication endpoint identifier. Alternatively, the verification module 310 may receive the communication endpoint identifier and provide the identifier to an external server for performing carrier verification. The verification module 310 may provide to the database management module 306 an indication of the verification result. If the verification is successful, the database management module 306 may update or generate an opt-in record associated with the communication endpoint identifier. If, however, the verification failed, the verification module 310 may provide to the database management module 306 an indication that verification was not successful. Accordingly, the database management module 306 may not generate or update an opt-in record.

The retargeting module 312 may be a hardware-implemented module which may provide retargeting features. Retargeting can include activities associated with providing targeted advertisements, such as text message alerts, based on online activities of users. For example, retargeting can include monitoring a user's browsers activities, analyzing the browser activities, selecting an alert based on the analysis, and generating a text message alert based on the selected alert. Additionally, retargeting can include utilizing information provided by the user during a survey portion of the opt-in process. For example, the text messaging system 300 may offer the user a reward for staying on the initial phone call to answer one or more questions of the survey. These answers may be used by the retargeting module 312 to select text message alerts. Accordingly, the retargeting module 212 can be configured to provide real-time data collection, retargeting logic, dynamically publication of text message alerts.

Example User Interface

Figure 4A:
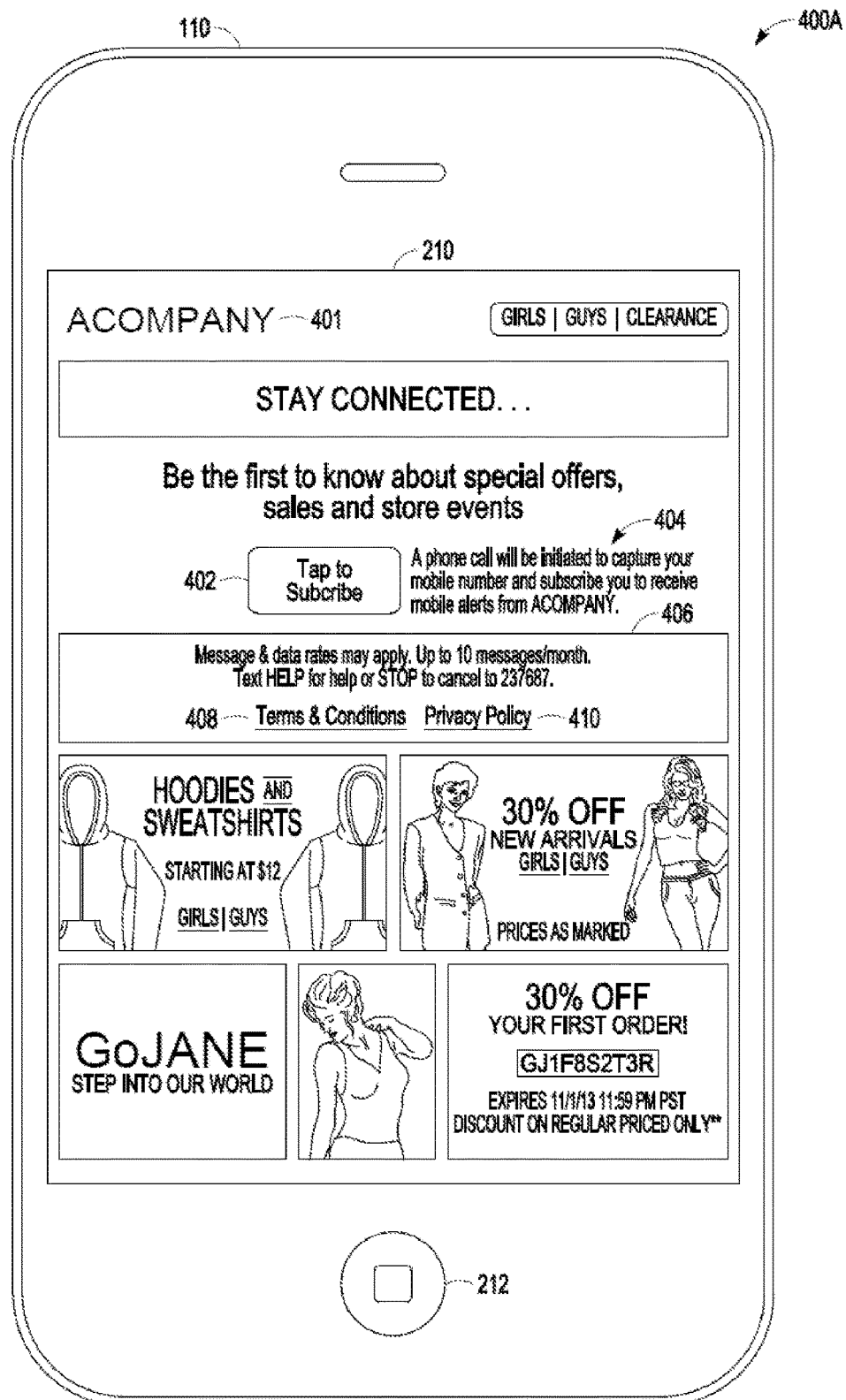
FIGS. 4A-C are interface diagrams illustrating example user interfaces with multiple display elements delivered to a client device, according to example embodiments.
Figure 4B:
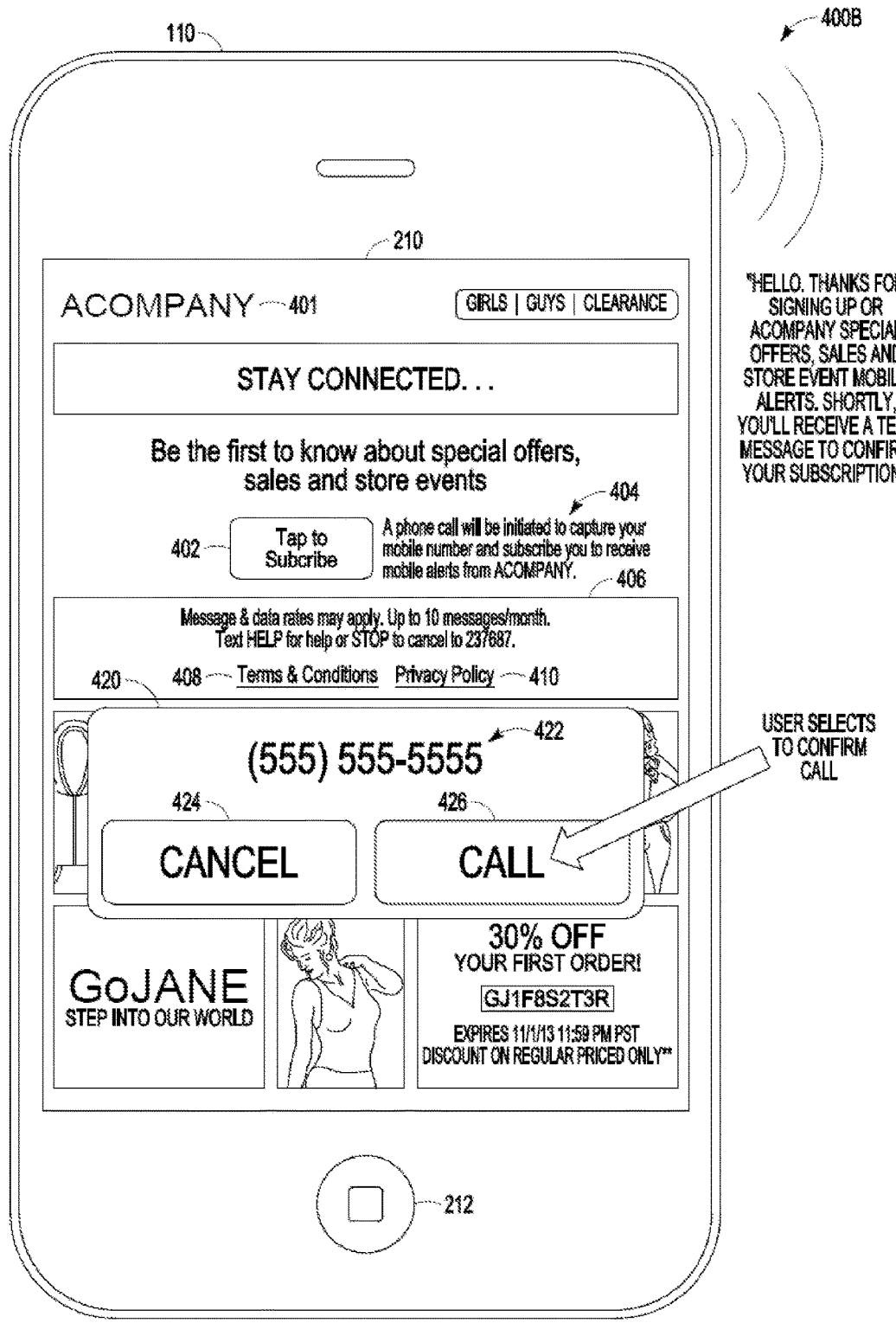
Figure 4C:

FIGS. 4A-C are interface diagrams illustrating example user interfaces with multiple display elements delivered to a client device, according to example embodiments. FIGS. 4A-C will be described in the context of user interfaces displayed on a mobile phone. However, it will be appreciated that the user interfaces may be displayed on other types of devices such as a desktop computer, laptop computer, or mobile computing device connected to the network 104.

FIG. 4A is an interface diagram illustrating an example user interface 400A of an alert enrollment invitation. As illustrated in FIG. 4A, the user interface 400A may be presented to a user on the display of a client device (e.g., client device 110). In this example, the user interface 400A corresponds to a graphical user interface of a webpage or software application executing on the client device 110 that allows the user to initiate the opt-in process to receive text message alert notifications.

In the illustrated example embodiment, the client device 110 includes the display 210 and the input device 212. In particular, the display 210 may correspond to a touch sensitive liquid crystal display (LCD) and the input device 212 may correspond to a pushbutton. The user may select elements of the user interface by touching the touch screen 210 and may push the button 212 to navigate to a previous user interface.

Furthermore, the user interface 400A includes user interface elements 401-410. The user interface element 401 may correspond to text displaying the name of the retailer. In this example, the retailer's name is "ACOMPANY." User interface element 402 may correspond to a control element such as a selectable button. The element 402 may include code and data for initiating a phone call to a specified phone number in response to the user selecting the element 402. In the example embodiment, the text messaging system 300 may transmit to the user device 110 data for the element 402, including a phone number assigned to the text messaging system 300. In operation, the user may tap the display 210 on or about the portion of the screen displaying element 402. In response, the client device 110 may initiate a phone call to the text messaging system 300, as will be described in greater detail in connection with FIG. 4B.

The element 404 may correspond to text that provides an explanation regarding the process after selecting the element 402. The element 406 may be a frame that includes details regarding the subscription. For example, in the illustrated example embodiment, the element 406 includes text describing that certain rates may apply, the frequency of messages, and instructions for how to request help or cancellation. The element 406 may also include elements 408, 410 which may correspond to hyperlinks. In particular element 408 may be selectable to navigate to a user interface screen displaying the terms and conditions of the subscription. The element 410 may be selectable to navigate to a user interface screen displaying privacy policy information.

FIG. 4B is an interface diagram illustrating an example user interface 400B of an alert enrollment invitation. As illustrated in FIG. 4B, the user interface 400B may be presented to a user on the display 210 of a client device (e.g., client device 110). In this example, the user interface 400B may correspond to a user interface of an alert enrollment invitation configured in response to the user selecting the element 402. In particular, the user interface 400B further includes window 420 that allows the user to cancel or confirm the phone call. The window 420 includes text 422 and buttons 424, 426. The text 422 corresponds to a phone number provided by the text messaging system 300. The button 424, if selected, cancels the phone call. The button 426, if selected, initiates the phone call.

In operation, if the user selects button 426 to confirm the call, the client device 110 will perform the phone call service. The text messaging system 300 may answer the phone call and provide to the user an audio or voice message. For example, the illustrated embodiment shows the message stating, "Hello. Thanks for signing up for ACOMPANY special offers, sales and store the event mobile alerts. Shortly, you'll receive a text message to confirm your subscription." The message may serve to signal to the user that the phone call was successful, that the text messaging system 300 successfully answered the phone call, and that the phone call has been completed.

In an example embodiment, the audio message may also invite the user stay on the call to participate in a survey. As an incentive, the audio message may offer a reward for the user if the user completes the survey. The survey may be conducted in a way that is convenient for the user. For example, voice recognition may be used so that the user may verbally answer the questions of the survey instead of typing answers on the device 110. Furthermore, the survey may include only a few questions so that the survey does not take up a substantial amount of the user's time. Information collected from the survey may be used to target or retarget text message alerts to the user.

FIG. 4C is an interface diagram illustrating an example user interface 400C of a confirmation text message. As illustrated in FIG. 4C, the user interface 400C may be rendered on the display 210 of the client device 110. In particular, the user interface 400C includes window 430 and the text message 432. As shown, the confirmation text message 432 includes the name for the alert program, the frequency of text message alerts, information about data rates, and instructions for requesting help and cancellation. The confirmation text message 432 may be received from the text message system 300 in response to the phone 110 making the phone call of FIG. 4B.

It will be understood by a person of ordinary skill that other embodiments of the user interfaces 400A-C need not include each element of FIGS. 4A-C and other embodiments may include more or less elements.

Example Subscription Processes

Figure 5:
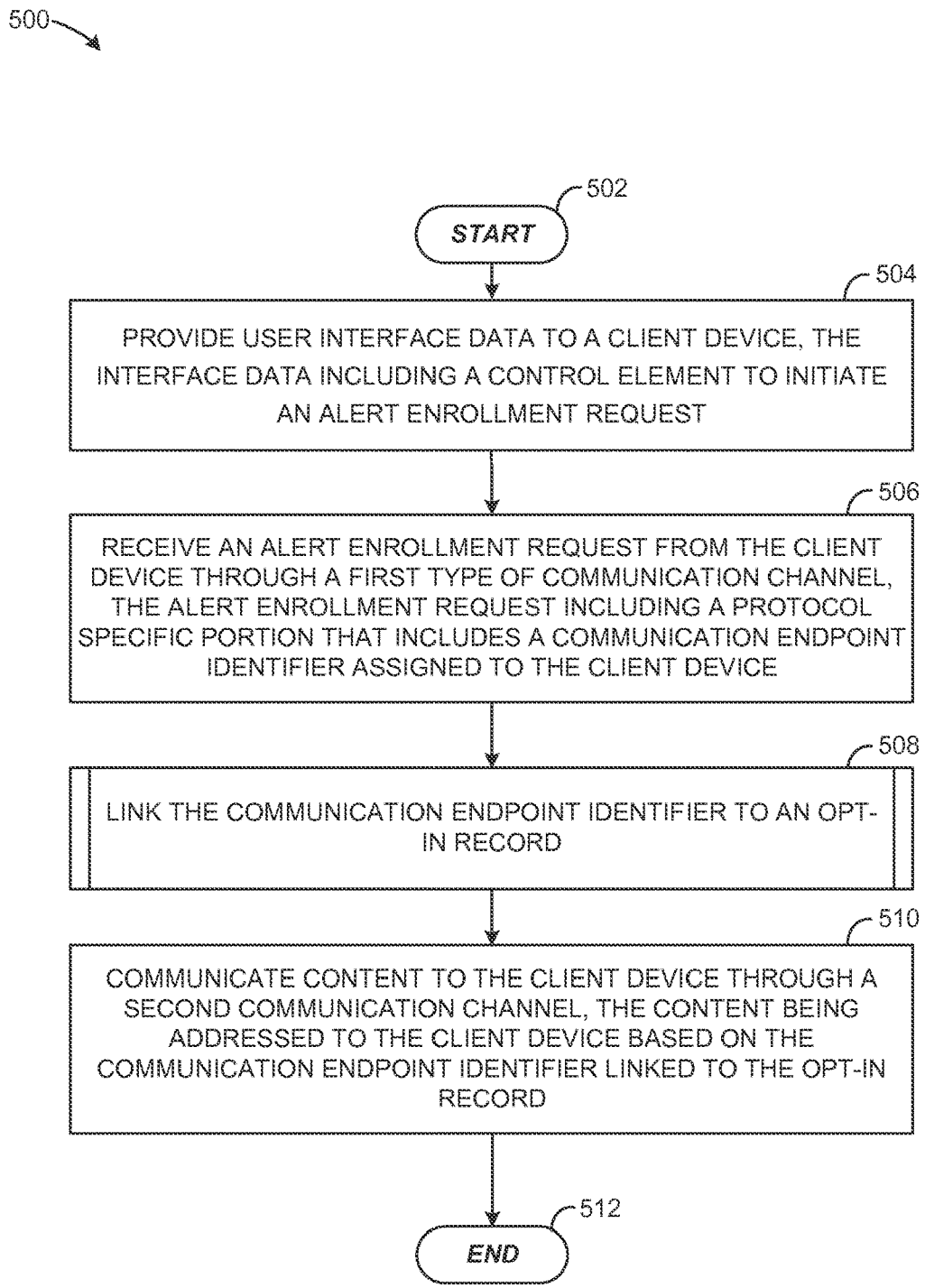
FIG. 5 is a flowchart illustrating an example method of recording an opt-in process request, in accordance with an example embodiment.

FIG. 5 is a flowchart illustrating an example method 500 of recording an opt-in process request, in accordance with an example embodiment. In this example, the method 500 may include operations such as providing user interface data 504, receiving an alert enrollment request 506, linking a communication endpoint identifier 508, and communicating content 510. The example method 500 will be described, by way of explanation, below as being performed by certain modules. It will be appreciated, however, that the operations of the example method 500 can be performed in any suitable order by any number of the modules shown in FIG. 3.

The method 500 starts at block 502 and proceeds to block 504 for providing user interface data to a client device. The interface data can include a control element to initiate an alert enrollment request. For example, the Internet communication interface module 304 may provide to the mobile phone 110 user interface data for displaying the user interface 400A of FIG. 4A. The provided data includes the element 402 and a phone number associated with the text messaging system 300. In particular, the phone number may be associated with a specified text message alert program (for example, a text message alert program associate with a particular retailer). As stated, the element 402 may correspond to a selectable button for initiating the alert enrollment request. That is, in response the user selecting or clicking the button 402, the mobile phone 110 will initiate a voice call service communication to the text messaging system 300 by calling the phone number provided by the Internet interface module 304.

In response to providing the user interface data, the method 500 can proceed from block 504 to block 506 for receiving an alert enrollment request from the client device through a first type of communication channel. As stated, the telephony interface module 302 may receive the alert enrollment request, which may correspond to a phone call transmitted by the client device 110 in response to the user selecting the element 402 of FIG. 4A.

The alert enrollment request may include a protocol specific portion that includes a communication endpoint identifier assigned to the client device. For example, as part of the telephony photo call, caller ID data may be provided to the called device. Accordingly, the telephony interface module 302 may receive caller ID data as part of the protocol for receiving the phone call from the user device 110.

At block 508, the method 500 includes linking the communication endpoint identifier to an opt-in record. For example, the database management module 306 may store the phone number in a data structure associate with a user account. Example user account data structure will be described in greater detail later in connection with FIG. 8. Furthermore, block 508 will be described in greater detail later in connection with FIG. 7.

At block 510, the method 500 can carry out communicating content to the client device through a second communication channel. The content is addressed to the client device based on the communication endpoint identifier linked to the opt-in record. In an example, the telephony interface module 302 may transmit a text message to the client device 110 via a channel using a text message service, such as SMS. The phone number to which the text message is sent to can be determined based on the phone number stored in the corresponding user account, as maintained by the database management module 306. Content of the text message may correspond to a text message alert or a confirmation text of the opt-in process. At block 512, the method 500 may end.

Figure 6:
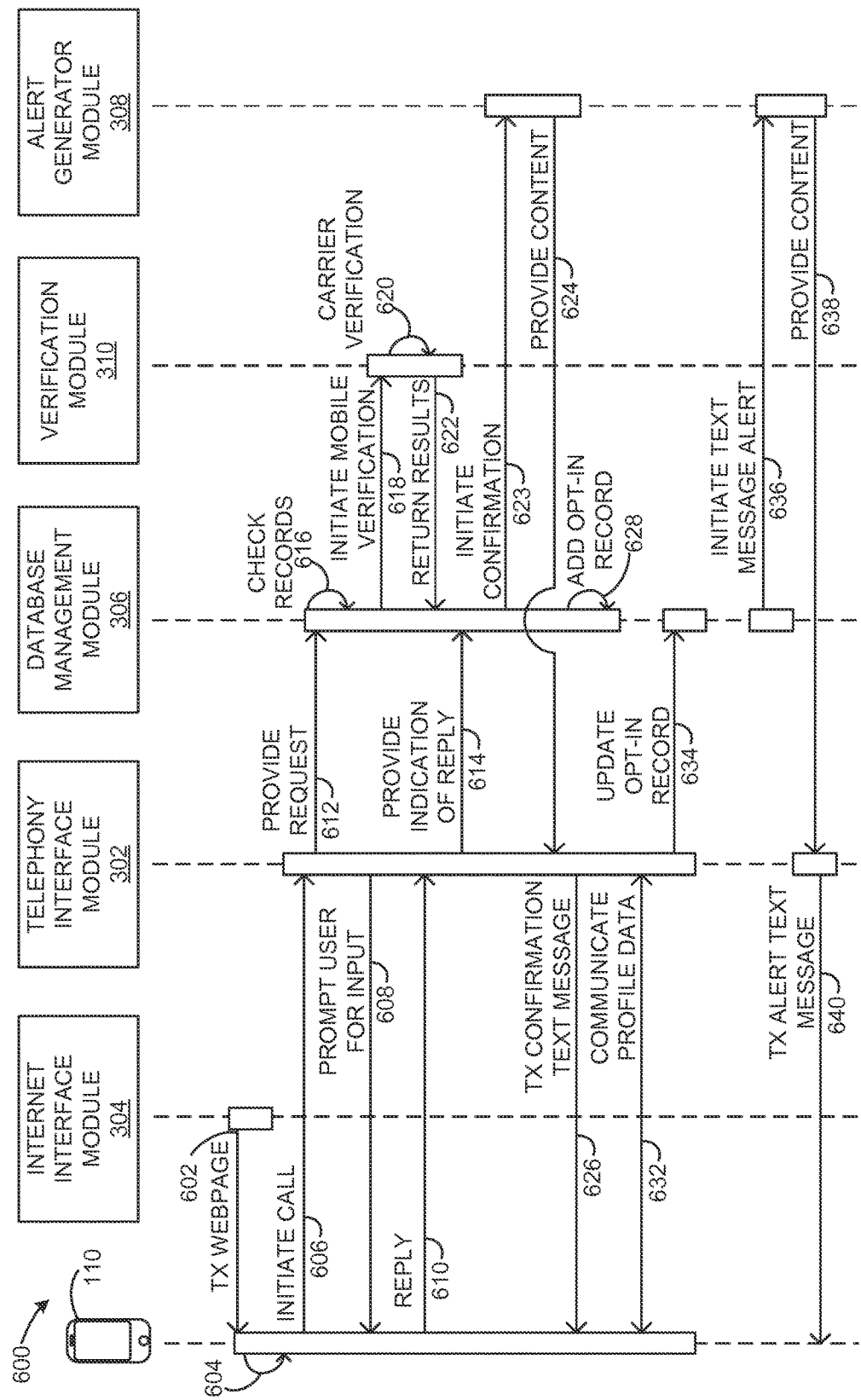
FIG. 6 is an interaction diagram illustrating a method of recording an opt-in process request, in accordance with an example embodiment.

FIG. 6 is an interaction diagram illustrating a method 600 of recording an opt-in process request, in accordance with an example embodiment. In particular, FIG. 6 illustrates interactions between various components of the network system 100, according to an example embodiment. Specifically, FIG. 6 illustrates interactions of a client device 110 and the modules 302-310 of FIG. 3.

At operation 602, the Internet interface module 304 transmits a webpage to the client device 110. The webpage may include a user interface, such as the user interface 400A. In an alternative embodiment, the Internet interface module 304 provides data for a software application executed by the client device 110. Rendering the user interface 400A, the client device 110 receives user input selecting the element 402. The user input may correspond to the user selecting a button (e.g., the element 402). The button includes data and code that, if selected, causes the client device 110 to initiate a telephone call to the text messaging system 300, as shown at operation 606. In particular, telephony interface module 302 receives the telephone call over a communications channel using a voice call service. The telephone call may correspond to an alert enrollment request from the client device 110.

In response to answering the telephone call from the user device 110, the telephony interface module 302 may further communicate with the client device 110. For example, the telephony interface module 302 may playback a voice message to the user. The voice message may provide information to the user regarding the opt-in process, as described in connection with FIG. 4B. Additionally and or alternatively, the voice message may prompt the user for a particular verbal reply. The prompt may correspond to a question asking the user to confirm the request, the date, and any other reply suitable to be detected with voice recognition. The verbal reply received by the telephony interface module 302, at operation 610, may be used to confirm that the phone call was initiated by a human, rather than automated software attack. For example, voice recognition may be used to determine whether the verbal reply matches an expected reply. If the verbal reply matches an expected reply, then authentication may be successful. At operation 614, the telephony interface module 302 may provide an indication of the reply to the database management module 306.

At operation 612, the telephony interface module 302 provides an indication of the request to the database management module 306. The indication may include caller ID data received by the telephony communication interface module 302 as part of the telephony protocol of receiving a phone call. At operation 616, the database management module 306 checks the opt-in records for a record that matches the telephone number of the client device 110. If there is a match, the database management module 306 may provide a message to the client device 110 to report that the phone number is already associated with an existent opt-in record. If there is not a match, at operation 618, the database management module 306 may initiate verification that the phone number of the client device 110 is a phone number of a mobile device. At operation 620, the verification module 310 may perform a carrier verification process in order to determine whether or not the phone number is a phone number of a mobile phone.

At operation 622, the verification module 310 returns the verification results to the database management module 306. If the verification failed, the method 600 can end. If the verification passed, the database management module 306 may proceed with the opt-in process at operation 623.

At operation 623, the database management module 306 initiates a process of generating a confirmation text message for the client device 110 by invoking the alert generator module 308. The alert generator module 308 generates content for the confirmation text message and, at operation 624, provides the content to the telephony interface module 302. At operation 626, the telephony interface module 302 prepares and transmits a text message that contains the content received from the alert generator module 308. At operation 628, the database management module 306 creates the opt-in record corresponding to the telephone number of the client device 110.

At operation 632, the client device 110 and the telephony interface module 302 may take part in a survey. For example, the telephony interface module 302 may playback a recording containing one or more questions or prompts. The client device 110 may transmit user input in response to the survey. The user inputs may correspond to verbal responses or nonverbal user input (such as, pressing the keypad of the client device 110). At operation 634, the telephony interface module 302 may provide the database manager module 306 the user input in order to update the account of the client device 110.

At operation 636, the database management module 306 may determine to send a text message alert to the client device 110. The database management module 306 may invoke the alert generator module 308 to provide content associated with a text message alert. At operation 638, the alert generator module 308 may provide selected content to the telephony interface module 302. The telephony interface module 302 may cause the text message alert to be transmitted to the client device 110.

Figure 7:
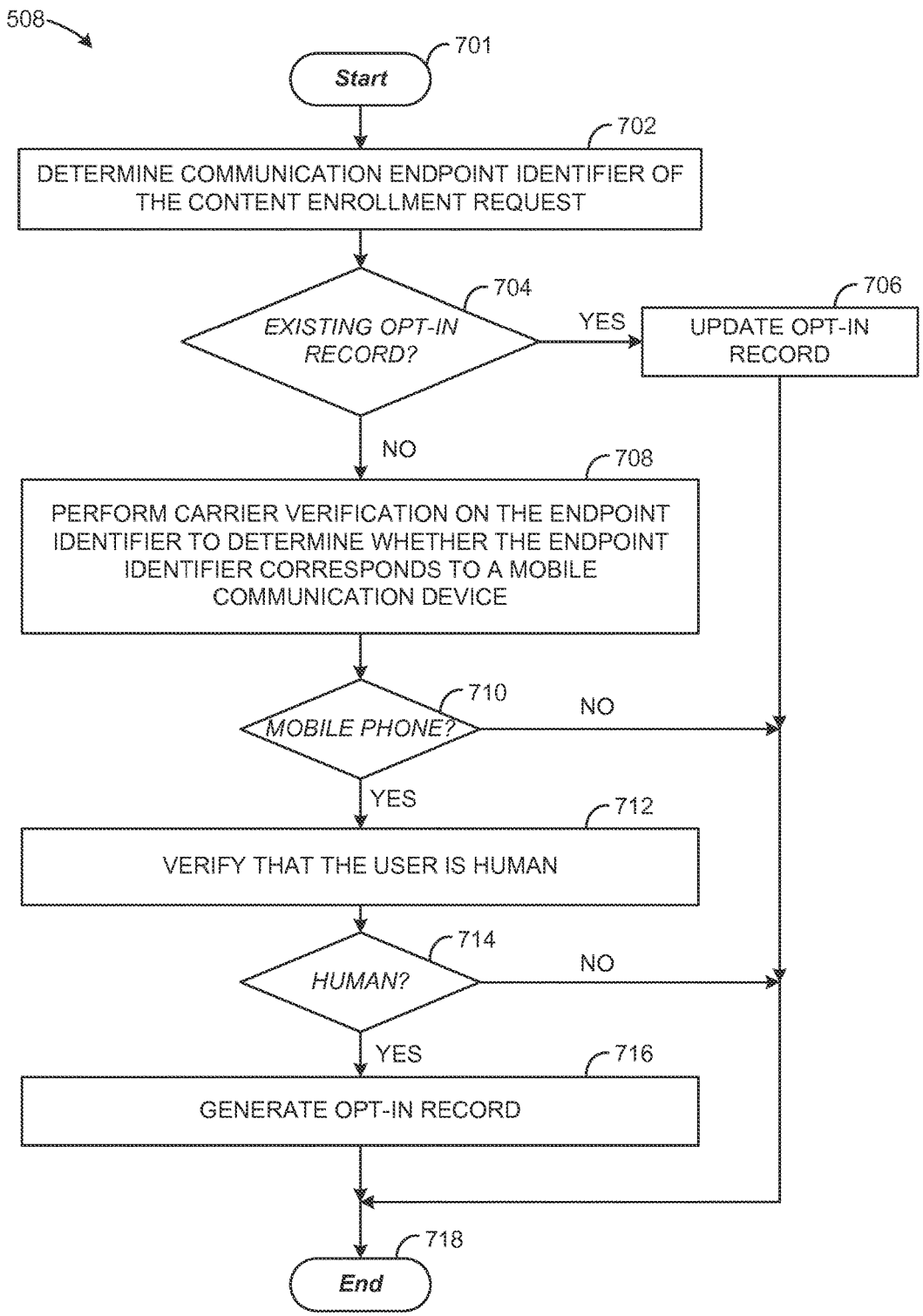
FIG. 7 is a flowchart illustrating an example method of linking a communication endpoint to an opt-in record, in accordance with an example embodiment.

FIG. 7 is a flowchart illustrating an example method 508 of linking a communication endpoint to an opt-in record, in accordance with an example embodiment. In this example, the method 508 may include operations such as determining communication endpoint identifier 702, updating the existing opt-in record 706, performing carrier verification 708, verifying that the user is human 712, and generating an opt-in record 716. The example method 508 will be described, by way of explanation, below as being performed by certain modules. It will be appreciated, however, that the operations of the example method 508 can be performed in any suitable order by any number of the modules shown in FIG. 3.

The method 510 starts at block 701 and proceeds to block 702 for determining a communication endpoint identifier of the content enrollment request. The communication endpoint identifier may correspond to a telephone number, determined by caller identification, of the client device of the content enrollment request. At block 702, the database management module 306 may determine whether the communication endpoint identifier was determined at block 702 matches a telephone number of an existing opt-in record. If there is an existing opt-in record, the method 508 may proceed to block 706 for updating the opt-in record, if necessary, and then proceed to block 718 to end. If there is no existing opt-in record, the method 508 may proceed to block 708 for performing carrier verification on the communication endpoint identifier to determine whether the endpoint identifier corresponds to a mobile communication device, such as a mobile phone. For example, the database management module 306 may invoke the verification module 310 for performing carrier verification.

If the carrier verification failed, the method 508 may proceed to block 718 to end. If the carrier verification passed, the method 508 may proceed to block 712 for verifying that the user is human. For example, the telephony interface module 302 may prompt the user of the client device to provide specified inputs. The inputs may be verbal utterances and/or one or more keypad presses to produce a sequence of dial tones. If the user input does not match the expected response, the method 508 may proceed to block 718 to end. If the user input matches the expected response, the method may proceed to block 716 for generating an opt-in record corresponding to the communication endpoint identifier that was determined at block 702. After generating the opt-in record, the method 508 may proceed to block 718 to end.

Example Data Structure

Figure 8:
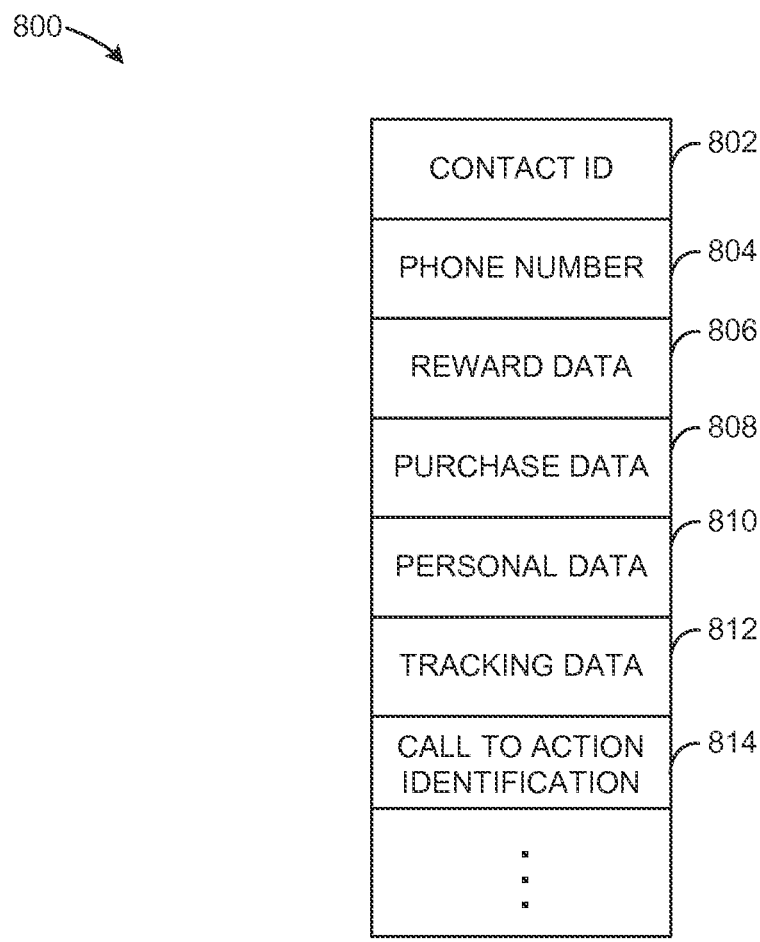
FIG. 8 is a block diagram illustrating an example data structure of a user account with multiple data fields stored in a database communicatively coupled to the network-based marketplace.
Figure 9:
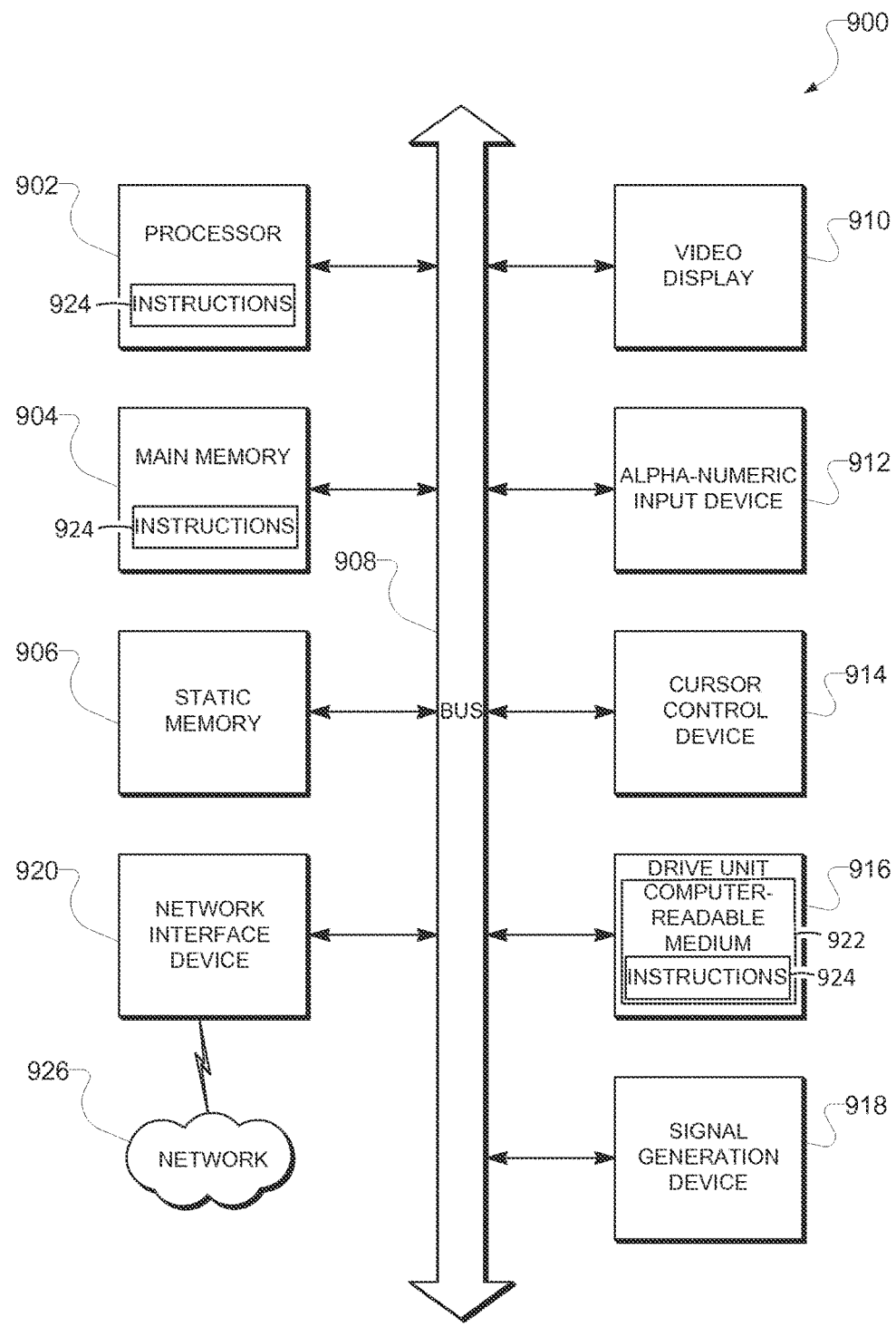
FIG. 9 is a block diagram of machine in the example form of a computer system within which instructions, for causing the machine to perform any one or more of the methodologies discussed herein, may be executed.

FIG. 8 is a block diagram illustrating an example data structure 800 of a user account with multiple data fields. The data structure 800 may be stored in a database 126 communicatively coupled to the network-based marketplace 102. The data structure 800 may be created and/or accessed by the database management module 306 in response to receiving user data (e.g., for opting in), adding a user account, determining a reward, determining text message alerts, tracking, and the like activities of the marketplace application 120. For example, user data can be inputted by a user via the user interfaces 400A-C in order to opt-in or subscribe to receiving text message notifications of product alerts. The user interfaces 400A-C can transmit the user input to the marketplace and payment applications 120, 122. Accordingly, the data structure 800 can be created by the database management module 306 in response to receiving the user data with the communication interface modules 302, 304.

The illustrated data structure 800 of FIG. 8 includes a contact ID data field 802, a phone number data field 804, a reward data field 806, a purchase data field 808, a personal data field 810, a tracking data field 812, a call to action identification (CTA ID) data field 814, and the like data related to a user account. The contact ID 802 can correspond to data identifying a user. The phone number data field 804 can correspond to a phone number to which text message alerts may be sent. The reward data field 806 can correspond to data related to past rewards or accumulated points. For example, the reward data field 806 can store one or more reward totals that have been provided to the user. The reward data field 806 can include data tracking redeemed rewards and or pending rewards (e.g., unused rewards). The purchase data field 808 can correspond to data tracking the corresponding users purchase history, including information related to past purchases, past purchase amounts, past purchase values, shipping addresses, purchase frequencies, and the like activities. The personal data field 810 can correspond to data related to the associated user's location, social network, employment status, and the like information. The tracking data field 812 can correspond to data, in addition to the data provided in data fields 802-810, related to tracking activities of the user. Tracking data can be used to support retargeting services. To protect private, sensitive user data, such information is either not collected or is protected by data security technology. The call to action identification data field 814 may correspond to data indicative of one or more call to actions to which the user has subscribed. For example, the data field 814 may be indicative of a program name (e.g., "ACOMPANY Text Message Alerts") and a text message frequency or limit for the corresponding user. It will be appreciated that, in alternative embodiments, the data field 814 may be indicative of more or less terms of condition-type information.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

FIG. 16 is a block diagram of machine in the example form of a computer system 1600 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1600 includes a processor 1602 (e.g., a central processing unit (CPU), a graphics processing unit (GPU) or both), a main memory 1604 and a static memory 1606, which communicate with each other via a bus 1608. The computer system 1600 may further include a video display unit 1610 (e.g., a liquid crystal display (LCD) or a cathode ray tube (CRT)). The computer system 1600 also includes an alphanumeric input device 1612 (e.g., a keyboard or a touch-sensitive display screen), a user interface (UI) navigation device 1614 (e.g., a mouse), a disk drive unit 1616, a signal generation device 1618 (e.g., a speaker) and a network interface device 1620.

Machine-Readable Medium

The disk drive unit 1616 includes a machine-readable medium 1622 on which is stored one or more sets of instructions and data structures (e.g., software) 1624 embodying or utilized by any one or more of the methodologies or functions described herein. The instructions 1624 may also reside, completely or at least partially, within the main memory 1604 and/or within the processor 1602 during execution thereof by the computer system 1600, the main memory 1604 and the processor 1602 also constituting machine-readable media.

While the machine-readable medium 1622 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any non-transitory, tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 1624 may further be transmitted or received over a communications network 1626 using a transmission medium. The instructions 1624 may be transmitted using the network interface device 1620 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed:

1. A system comprising:

one or more hardware processors; and a non-transitory machine-readable medium for storing instructions that, when executed by the one or more hardware processors, cause the one or more hardware processors to perform operations comprising:

receiving an alert enrollment request from a client device, the alert enrollment request being received through a first type of telecommunication channel using a first telecommunication protocol, the alert enrollment request including a communication endpoint identifier assigned to the client device;

determining the communication endpoint identifier based on the alert enrollment request;

in response to the alert enrollment request, generating and transmitting via the first type of telecommunication channel an anti-fraud verification request to the client device using the first telecommunication protocol and the communication endpoint identifier assigned to the client device, the anti-fraud verification request including a phrase to be repeated by a user of the client device;

based on the alert enrollment request and a response from the client device to the anti-fraud verification request, automatically performing an anti-fraud verification of the client device;

based on the automatic performing of the anti-fraud verification of the client device, linking the communication endpoint identifier to an opt-in record of a database, the linking including performing a write operation to write the communication endpoint identifier to a data structure associated with the opt-in record;

generating an alert in a form compatible with a second telecommunication protocol; and transmitting, based on the linking of the communication endpoint identifier to the opt-in record, the alert to the client device through a second type of telecommunication channel using the second telecommunication protocol, the alert being addressed to the client device based on the communication endpoint identifier linked to the opt-in record.

2. The system of claim 1, wherein the first type of telecommunication channel is a voice call service provided by a telephony network.

3. The system of claim 2, wherein the communication endpoint identifier is a telephone number usable to establish a phone call with the client device.

4. The system of claim 2, wherein the second type of telecommunication channel is a text message service provided by the telephony network.

5. The system of claim 1, wherein:
the alert enrollment request includes caller line identification data; and
the linking of the communication endpoint identifier to the opt-in record includes:
determining the communication endpoint identifier further based on accessing caller line identification data of the alert enrollment request;
determining that the determined communication endpoint identifier is not linked to an existing opt-in record; and
generating a new opt-in record based on a determination that the communication endpoint identifier is not linked to the existing opt-in record.

6. The system of claim 5, wherein the linking of the communication endpoint identifier to the opt-in record includes determining, based on the communication endpoint identification, that the client device is a mobile phone, and wherein the generating of the new opt-in record is further based on a determination that the client device is the mobile phone.

7. The system of claim 1, wherein the operations further comprise:
transmitting, over a third type of telecommunication channel, an alert enrollment invitation to the client device.

8. The system of claim 7, wherein the third type of telecommunication channel is an Internet Protocol service provided by a network.

9. The system of claim 7, wherein the alert enrollment invitation includes a selectable user interface control element to initiate transmission of the alert enrollment request by the client device to a text messaging system.

10. The system of claim 1, wherein the operations further comprise:
communicating a confirmation message to the client device based on the linking of the communication endpoint identification to the opt-in record, the confirmation message including at least one of data to display text stating a name for an alert program, a frequency of text messages, or instructions for help or for canceling.

11. A computer-implemented method comprising:
receiving, at a server, an alert enrollment request from a client device, the alert enrollment request being received through a first type of telecommunication channel using a first telecommunication protocol, the alert enrollment request including a communication endpoint identifier assigned to the client device;
determining the communication endpoint identifier based on the alert enrollment request;
in response to the alert enrollment request, generating and transmitting via the first type of telecommunication channel an anti-fraud verification request to the client device using the first telecommunication protocol and the communication endpoint identifier assigned to the client device, the anti-fraud verification request including a phrase to be repeated by a user of the client device;
based on the alert enrollment request and a response from the client device to the anti-fraud verification request, automatically performing an anti-fraud verification of the client device;
based on the automatic performing of the anti-fraud verification of the client device, linking the communication endpoint identifier to an opt-in record of a database, the linking including performing a write operation to write the communication endpoint identifier to a data structure associated with the opt-in record;
generating an alert in a form compatible with a second telecommunication protocol; and
based on the linking of the communication endpoint identifier to the opt-in record, transmitting the alert to the client device through a second type of telecommunication channel using the second telecommunication protocol, the alert being addressed to the client device based on the communication endpoint identifier linked to the opt-in record.

12. The computer-implemented method of claim 11, wherein the first type of telecommunication channel is a voice call service provided by a telephony network.

13. The computer-implemented method of claim 12, wherein the communication endpoint identifier is a telephone number usable to establish a phone call with the client device.

14. The computer-implemented method of claim 12, wherein the second type of telecommunication channel is a text message service provided by the telephony network.

15. The computer-implemented method of claim 11, wherein:
the alert enrollment request includes caller line identification data; and
the linking of the communication endpoint identifier to the opt-in record includes:
determining the communication endpoint identifier further based on accessing caller line identification data of the alert enrollment request;
determining that the determined communication endpoint identifier is not linked to an existing opt-in record; and
generating a new opt-in record based on a determination that the communication endpoint identifier is not linked to an existing opt-in record.

16. A non-transitory machine-readable storage medium comprising instructions that, when executed by one or more hardware processors of a machine, cause the one or more hardware processors to perform operations comprising:
receiving an alert enrollment request from a client device, the alert enrollment request being received through a first type of telecommunication channel using a first telecommunication protocol, the alert enrollment request including a communication endpoint identifier assigned to the client device;
determining the communication endpoint identifier based on the alert enrollment request;
in response to the alert enrollment request, generating and transmitting via the first type of telecommunication channel an anti-fraud verification request to the client device using the first telecommunication protocol and the communication endpoint identifier assigned to the client device, the anti-fraud verification request including a phrase to be repeated by a user of the client device;

based on the alert enrollment request and a response from the client device to the anti-fraud verification request, automatically performing an anti-fraud verification of the client device;

based on the automatic performing of the anti-fraud verification of the client device, linking the communication endpoint identifier to an opt-in record of a database, the linking including performing a write operation to write the communication endpoint identifier to a data structure associated with the opt-in record;

generating an alert in a form compatible with a second telecommunication protocol; and based on the linking of the communication endpoint identifier to the opt-in record, transmitting the alert to the client device through a second type of telecommunication channel using the second telecommunication protocol, the alert being addressed to the client device based on the communication endpoint identifier linked to the opt-in record.

17. The non-transitory machine-readable storage medium of claim 16, wherein the first type of telecommunication channel is a voice call service provided by a telephony network.

18. The non-transitory machine-readable storage medium of claim 17, wherein the communication endpoint identifier is a telephone number usable to establish a phone call with the client device.

19. The non-transitory machine-readable storage medium of claim 17, wherein the second type of telecommunication channel is a text message service provided by the telephony network.

* * * * *